United States Patent Office 3,166,457
Patented Jan. 19, 1965

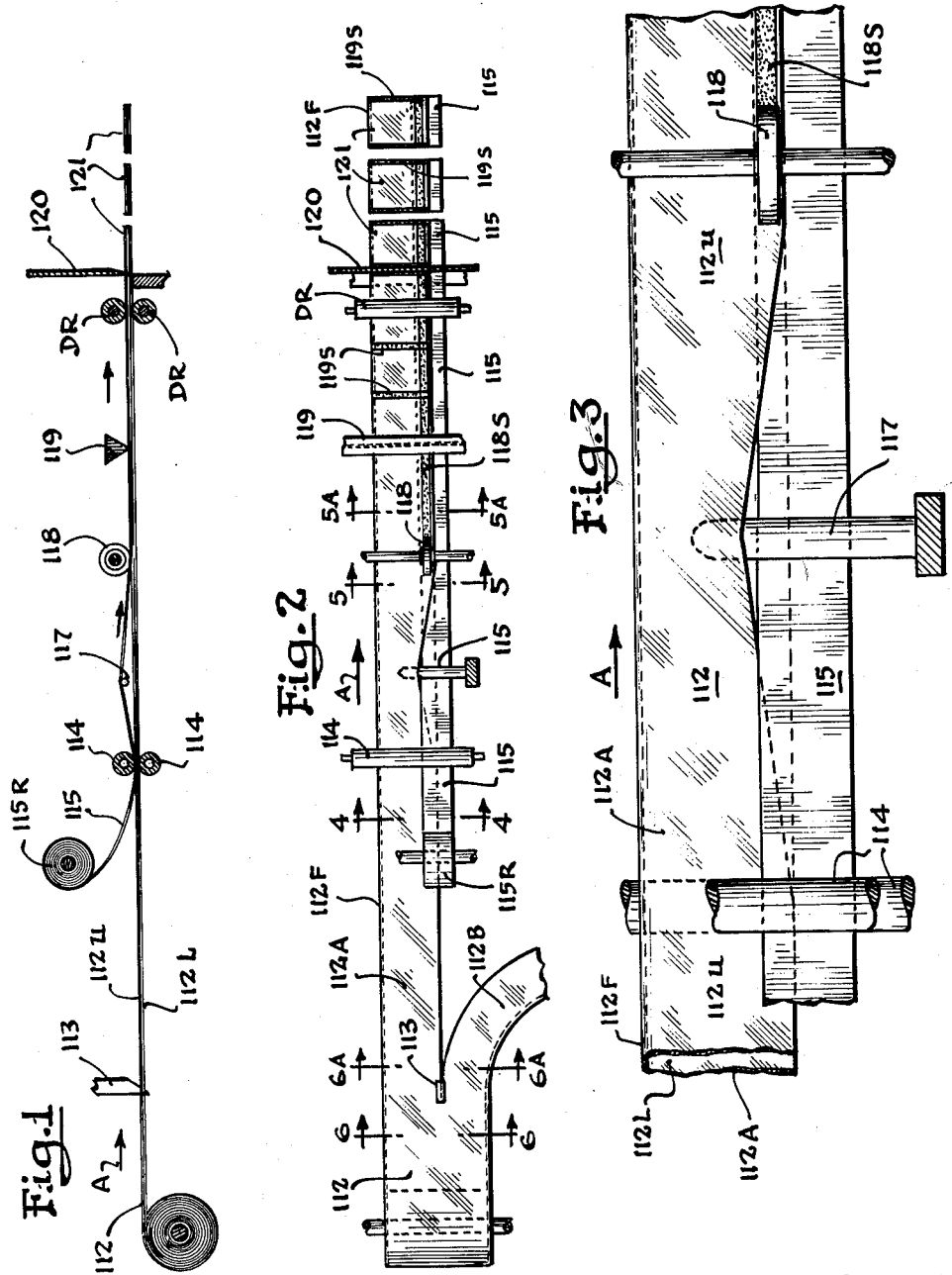

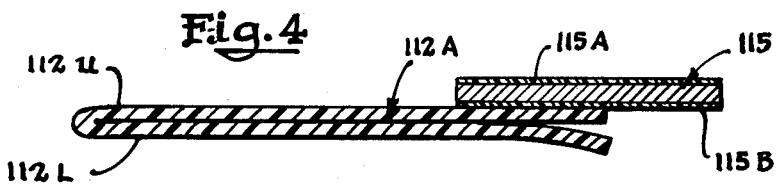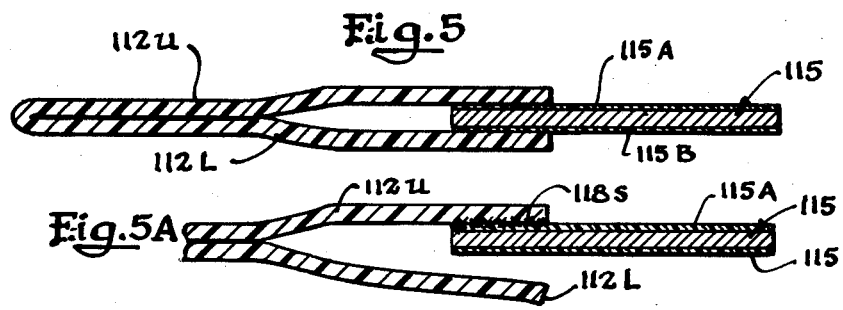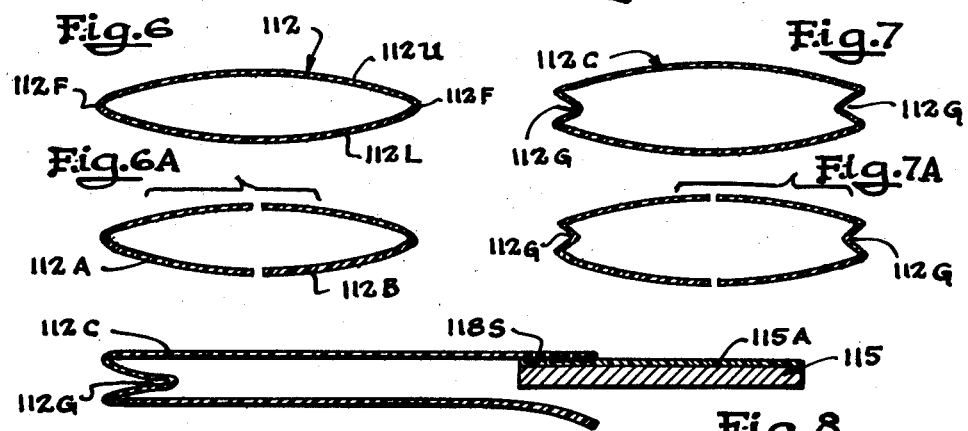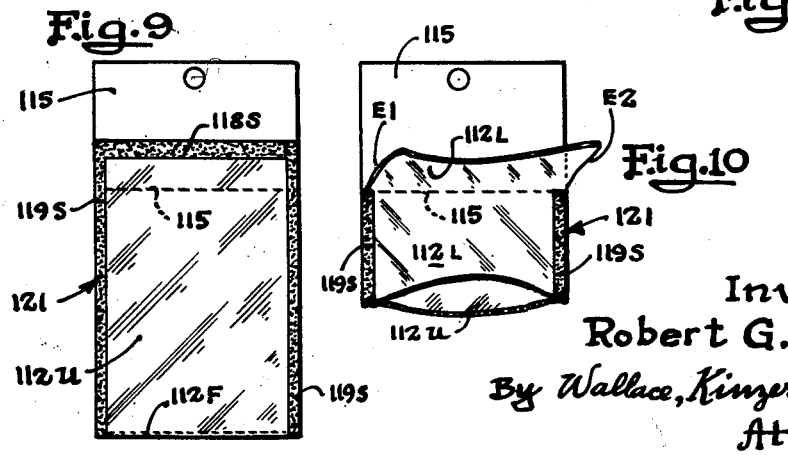

3,166,457
METHOD OF MAKING BAGS
Robert G. Nichols, 211 Skyline Drive, Barrington, Ill.
Filed Aug. 31, 1962, Ser. No. 220,718
4 Claims. (Cl. 156—269)

This invention relates to a method of making a bag or container inclusive of an envelope or bag composed of thin, transparent thermoplastic film material, and an insert of stiffer material.

Specifically, the process disclosed herein relates to a novel way of inserting a header or stiff liner continuously into the seamless tubing or sheet material which affords the envelope portion of the bag, and particularly to the method of insertion.

The process of the present invention enables bags to be made in a continuous process from seamless polyethylene tubing, or tubing of similar thermoplastic film material, and eliminates the need for heat sealing the bottom of a package or bag that includes thermoplastic film material. Additionally, it is possible to produce containers wherein the bottom of the bag includes a gusset. The foregoing achievements represent primary objects of the present invention.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a schematic view illustrating one procedure under the present invention;

FIG. 2 is a plan view of what is shown in FIG. 1;

FIG. 3 is a plan view on an enlarged scale of a portion of what is shown in FIG. 2;

FIGS. 4, 5, 5A, 6 and 6A are sectional views on an enlarged scale on the lines 4—4, 5—5, 5A—5A, 6—6, and 6A—6A of FIG. 2;

FIG. 7 is a sectional view of gusseted tubing that may be used in the process;

FIG. 7A shows the result of slitting the gusseted tubing to afford an open-ended web;

FIG. 8 is a cross-section of a bag obtained under the present invention using gusseted tubing therefor; and FIGS. 9 and 10 are plan views of the opposite sides of a typical bag obtained under the present invention.

FIG. 1 is a side or elevational view of the process for producing a bag of the kind shown in FIG. 2. A roll of sheet material is afforded in the form of transparent, heat-sealable thermoplastic film 112 such as polyethylene, polypropylene, Saran film, Mylar film or the like. The sheet material 112 may be a roll of seamless, so-called lay-flat tubing of plain form, FIG. 6, of double thickness presenting two sides or panels, upper 112U and lower 112L joined by a fold 112F.

The sheet material is pulled from its roll by drive rollers DR, and in the instance of 360° tubing the sheet is split down the middle by a knife 113 to produce an open-ended section 112A, FIGS. 2 and 6A.

At idler rolls 114 a second form of sheet material 115 is introduced which is heat sealable, preferably on both sides, to the film section 112A. In the example disclosed, the second material is paper coated on both sides at 115A and 115B, FIG. 4, with heat sealable, thermoplastic polyethylene. The material 115 will henceforth be referred to as paper, although it can readily be seen that it could be otherwise, and in particular can be a strip of plastic foam heat sealable to the film strip 112A.

At idlers 114, the paper is juxtaposed on the top of the web of film material 112A, and the extent of lap is such as desired for the depth to which the paper is to be inserted between the sheet walls 112U and 112L to provide a straight line draw through the bag forming machine in the direction indicated by the arrow A, FIG. 2.

The paper 115 is advanced from a roll 115R and at first travels on top of the sheet web 112A, as noted, parallel thereto, until it reaches an inserting element in the form of a shaft 117 that is interposed between the paper 115 (which underlies the inserting element) and the upper panel 112U of the web 112. At this point (see FIG. 3) the upper wall of the sheet material 112U is slipped out from under the paper web 115 by the inserting shaft 117. Thus, the paper web 115 and the lower sheet 112L ride under the inserting shaft 117 during which time the paper 115 remains on top of the lower sheet 112L.

In other words, the inserting shaft or blade is interposed between the upper surface of the paper web 115 and the underside of the upper film panel 112U, so that as the webs 112A and 115 travel past the shaft 117, the upper sheet or panel 112U is superimposed on the upper side of the paper insert 115, and the latter is superimposed on the upper side of the lower panel 112L. Thereafter, the webs are run under a heat sealer 118 which is a continuous wheel type or hot wire, or any device suitable for bonding the upper film panel 112U to the paper insert 115.

At the sealer 118, the paper 115 becomes integrally affixed to the free end of the web 112A by a heat seal 118S effective between the panel 112U and the surface coating of thermoplastic heat sealable material 115A on the paper strip 115.

The joined webs 112A and 115 now move through the machine to a cross or transverse sealing bar 119 which heat seals the upper and lower webs 112U and 112L along lines 119S transverse to the continuous seal 118S, and in so doing double heat seals panel 112U to the paper 115.

The united web is next subjected to the action of a cut-off knife 120, which severs each cross seal 119S approximately in half as indicated in FIG. 2. This process produces finished bags 121 as shown in FIGS. 1, 2, 9 and 10 as described in somewhat more detail hereinafter.

For purposes of clarification, one half 112B of the tubing 112 that is not run through the process is diverted. In practice, the section 112B may be rewound, diverted to process two webs at once in the manner of processing the web 112A, or diverted into another machine for the same process as the undiverted half 112A. The sheet material 112 disclosed in FIG. 2 is a seamless tube, although the process works equally well with gusseted material, as will be shown hereinafter.

Once the process is set in motion there is a continuous pull on the webs 112 and 115 by the drive rolls DR, and before starting the continuous pull on the webs, the upper sheet wall or panel 112U is pulled over the insert shaft 117 so that the innermost end of the insert shaft 117 is interposed between the panels 112U and 112L. The insert shaft 117 may be of any desired shape or size, although sharp edges should be avoided.

In the event the stock chosen for web 115 is light weight and easily penetrated by heat, an insulating material may be introduced between the paper web 115 and the thermoplastic panel 112L at points to prevent inadvertent sealing of these two sheets, unless such sealing is desired.

If the starting web is a double gusseted thermoplastic tube, it will have the cross section shown at 112C in FIG. 7, a cross-section corresponding to FIG. 6. Thus, while the starting web of tube form in this instance is continuous, it includes gussets 112G at each side, and the result of severing such gusseted web by the knife 113 is shown in FIG. 7A, a cross-section corresponding to FIG. 6A. The bag product obtained therefrom under the present invention is shown in FIG. 8 as including an envelope of thermoplastic film material having a gusseted bottom 112G with the paper insert 115 of the kind described above attached by the heat seal 118S to one of the film panels at the open end of the envelope.

The bags 121 are in the nature of those disclosed in my copending application Serial No. 176,486, filed February 23, 1962, now Patent No. 3,097,788. Thus, FIGS. 9 and 10 are enlarged views of the completed bag 121 wherein the envelope or pocket portion is defined by two panels 112U and 112L joined at the bottom by the fold. The closed sides are defined by the spaced heat seals 119S transverse to the fold 112F. The paper inserted in the open end of the bag, being as wide as the remote portions of the transverse heat seals when the bags are severed from the web by the knife 120, is secured within the open end of the bag by the heat seal 118S. In fact, the heat seals 118S and 119S overlap at the lateral ends of the paper insert.

The insert, as has been explained, is heat sealed to only one panel of the bag, panel 112U, so that the bag 121 has an open end, FIG. 10. Therefore, the panel 112L, FIG. 10, is free of the insert and has free ends E1 and E2 that were slit by the knife 120 when it was effective to split, down the middle, adjacent heat seals 119S' of the joined webs 112A and 115. Therefore, the panels 112U and 112L at the open end of the bag are defined by slits that enable the panels to be opened and easily filled by sliding the fingers in between the insert 115 and the flap on the panel 112L that is afforded by the slits. At the same time, the ends of the heat seals 119S at the edges E1 and E2 serve to prevent the slits from being enlarged.

It will be appreciated that the bag shown in FIG. 8 as having a gusseted bottom will be identical to the bag shown in FIGS. 9 and 10 except for the enlarged or gusseted bottom.

It will be seen from the foregoing that the present invention makes it possible to produce bags as 121 in large numbers by continuously processing two webs, one being a folded web of film material and the other being an insert header as 115 inserted between the two panels that characterize the folded web of thermoplastic material. The header may be inserted just sufficiently to permit enough contact for a good heat seal to the free end of one of the panels, or can be inserted to the full depth possible. Thereafter, the first and second materials are heat sealed along a continuous line as 118S parallel to the path of movement of the webs in the process line. This joins the header to one of the film panels. The two panels are themselves bonded by transverse heat seals as 119S, and these seals are then cut down the middle resulting in individual bags or containers having an envelope of thermoplastic film characterized by an integral fold at the bottom, parallel heat seals at the sides, and a header at the open end bonded to the inside face of only one of the panels.

The header may be printed with various data and may be punched for sales display on a hook. In any event, the bag after manufacture can be filled with goods to be merchandised, whereafter the open end of the bag can be closed as by heat sealing.

I claim:

1. A method of mass producing bags each inclusive of a U-shaped envelope of thermoplastic material, closed at the bottom by the bight or fold of the material, and an insert of stiffer material between the panels of the envelope comprising; advancing a first web of the thermoplastic material, having the shape aforesaid, and a second web of the stiffer material in juxtaposed relation to an inserter element, with the second web being disposed atop the first web, said inserter being interposed between the upper panel of thermoplastic material and the second web to bring the upper thermoplastic panel over the paper web, thereafter sealing the upper panel of thremoplastic material to the adjacent face of the second web, joining the thermoplastic panels at spaced intervals corresponding to the desired width of the bags, and thereafter cutting the bags from the joined webs.

2. A method of mass producing bags each inclusive of a U-shaped envelope of thermoplastic film material, closed at the bottom by the fold of the film and presenting parallel side panels, and an insert of stiffer material between the panels of the envelope at the open end thereof comprising: continuously advancing a first web of the film material, having the shape aforesaid, and a second web of the stiffer material in horizontal juxtaposed relation past a blade-like inserter at an inserter station with the second web overlapping the upper one of the panels of the first web adjacent the free edges of the panels, said inserter being interposed between said upper panel and the second web to continuously bring the upper panel over the paper web at the inserter station, thereafter sealing one of the panels of thermoplastic material to the adjacent face of the second web by heat seals transverse to the fold in the film material and spaced one from another by the desired width of the bags, and then severing the webs midway the length of the seals to produce bags of the desired width.

3. A method of mass producing bags each inclusive of a U-shaped envelope of thermoplastic film material, closed at the bottom by the fold of the film and presenting parallel side panels, and an insert of stiffer material between the panels of the envelope at the open end comprising: advancing a first web of the film material, having the shape aforesaid, and a second web of the stiffer material in horizontal juxtaposed relation past a blade-like inserter with the second web overlapping the upper one of the panels of the first web adjacent the free edges of the panels, said inserter being interposed between said upper panel and the second web to bring the upper panel over the upper surface of the paper web thereby inserting the paper web between said panels, thereafter heat sealing one of the panels of thermoplastic film material to the adjacent face of the second web along a continuous line parallel to the path of travel of the webs, heat sealing the panels at spaced intervals corresponding to the desired width of the bags, and separating bags of said desired width from the joined webs.

4. A method of mass producing bags each inclusive of a U-shaped envelope of thermoplastic material, closed at the bottom by the bight of the material, and an insert of stiffer material between the panels of the envelope comprising: advancing continuously a first web of the thermoplastic material, having the shape aforesaid, and a second web of the stiffer material in juxtaposed relation to a blade-like inserter with the second web being disposed atop the first web, said inserter being interposed between the upper panel and the second web to bring the upper thermoplastic panel over the paper web, moving the webs continuously past the inserter interposed as aforesaid to continuously bring the upper thermoplastic panel over the paper web, thereafter sealing the upper panel of thermoplastic material to the adjacent face of the second web and sealing the panels to one another by transverse seals spaced from one another a distance corresponding to the desired width of the bags, said transverse seals being transverse to said bottom bight and extending from the bottom bight to the insert, and severing the webs at spaced intervals along said transverse seals to produce bags of the desired width.

References Cited by the Examiner
UNITED STATES PATENTS

| | | | |
|---|---|---|---|
| 2,331,067 | 10/43 | Young | 156—269 |
| 2,878,849 | 3/59 | Lingenfelter et al. | 156—269 |
| 2,971,874 | 2/61 | Canno | 156—269 |

EARL M. BERGERT, *Primary Examiner.*